United States Patent [19]
Rolf et al.

[11] Patent Number: 5,224,967
[45] Date of Patent: Jul. 6, 1993

[54] PROTECTIVE WRAP FOR PREVENTING DAMAGE TO GIRDLED TREES AND OTHER PLANTS AND METHOD

[75] Inventors: David Rolf, Minneapolis; Michael F. Shelton, Edina, both of Minn.

[73] Assignee: Lec Tec Corporation, Minnetonka, Minn.

[21] Appl. No.: 929,153

[22] Filed: Aug. 12, 1992

Related U.S. Application Data

[63] Continuation-in-part of Ser. No. 639,577, Jan. 9, 1991, Pat. No. 5,142,817.

[51] Int. Cl.$^5$ .............................. A01G 17/12
[52] U.S. Cl. ............................. 47/58; 47/24
[58] Field of Search ............. 47/24, 23, 25, 58; 106/15.05; 424/16, 17

[56] References Cited

U.S. PATENT DOCUMENTS

| | | | |
|---|---|---|---|
| 2,593,781 | 4/1952 | Meis | 47/108 |
| 2,947,111 | 8/1960 | Zobrist | 47/58 |
| 3,068,087 | 12/1962 | Davis | 71/2.1 |
| 3,333,361 | 8/1967 | Manak | 47/58 |
| 3,592,910 | 7/1971 | Clark | 424/300 |
| 3,864,114 | 2/1975 | Green | 71/3 |
| 4,299,818 | 11/1981 | Vite | 424/84 |
| 4,734,281 | 3/1988 | Yamamoto | 424/408 |
| 4,766,695 | 8/1988 | Harlow | 47/24 |
| 5,142,817 | 1/1991 | Rolf | 47/24 |

FOREIGN PATENT DOCUMENTS

| | | |
|---|---|---|
| 0367140 | 5/1990 | European Pat. Off. . |
| 61-195634 | 8/1986 | Japan . |
| 61-260828 | 11/1986 | Japan . |
| 63-328001 | 10/1988 | Japan . |

OTHER PUBLICATIONS

Commercial Product: LecTec Corporation plant wrap.

*Primary Examiner*—Henry E. Raduazo
*Attorney, Agent, or Firm*—James V. Harmon

[57] ABSTRACT

The invention provides a method of preserving the life of girdled plants, such as trees, shrubs or flowering plants, comprising applying to the girdled area a wrap composed of a flexible tape backing formed from a water insoluble polymeric sheet, e.g., nonwoven fabric, suited for being wound into a roll or dispensed as cut sheets. To the backing is applied a homogeneous, hydrophilic, stable matrix. The matrix is hydratable by atmospheric moisture, has a bonding surface which conforms to the contours of the plant, and is sufficiently tacky to hold the tape in place after being wrapped around the plant. The matrix includes (a) a liquid phase comprising a hydrophilic, polar, water-miscible liquid for plasticizing the matrix and (b) a water soluble or water swellable hydrophilic film-forming polymer uniformly admixed with said liquid to form a flexible matrix. The matrix serves as a reservoir which is easily hydrated and will swell in a humid environment to assist in carrying plant fluids through the girdled area to thereby preserve the life of the plant.

14 Claims, 1 Drawing Sheet

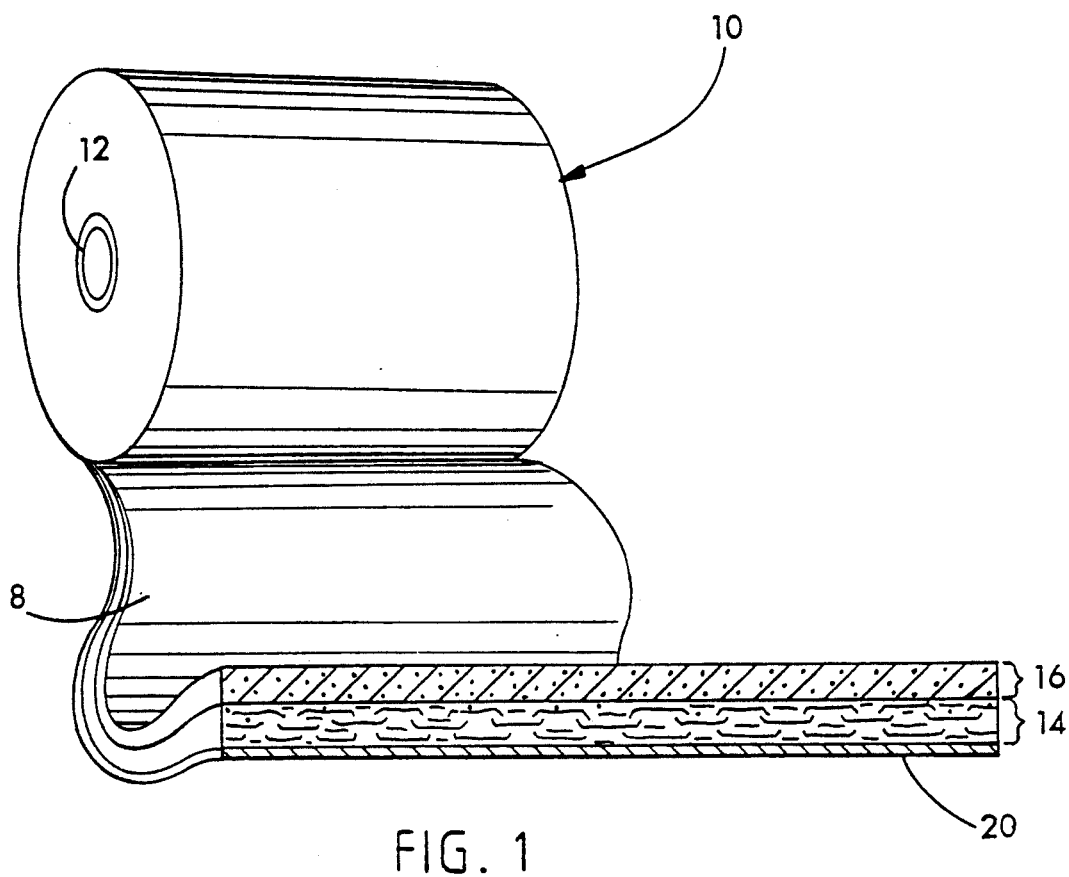
FIG. 1
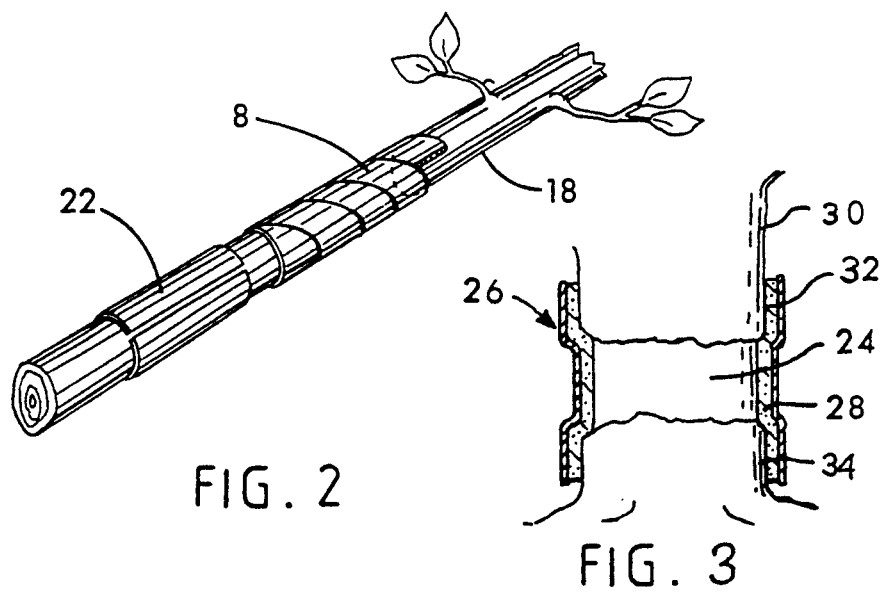
FIG. 2
FIG. 3

PROTECTIVE WRAP FOR PREVENTING DAMAGE TO GIRDLED TREES AND OTHER PLANTS AND METHOD

The present application is a continuation-in-part of prior application Ser. No. 07/639,577, filed Jan. 9, 1991 now U.S. Pat. No. 5,142,817 and bearing the titled PROTECTIVE WRAP FOR TREES AND OTHER PLANTS.

FIELD OF THE INVENTION

The present invention relates to plant protection and more particularly to protective material in sheet or self-wound roll form for protecting plants.

BACKGROUND OF THE INVENTION

Trees that are girdled by deer, rodents or other pests almost always die as a result. A major objective of the invention is to find a way of saving the lives of girdled trees and other plants.

Many amorphous compositions have been in commercial use for protecting trees and shrubs. The paste type protectant which has to be put on the plant by means of a spatula or brush is time-consuming to apply, may be washed away over time and has other disadvantages. For example, coating thickness will vary so that results are inconsistent. By contrast, the present invention is concerned with the provision of a protective wrap in sheet form to be supplied either as cut sheets or in rolls which can be wrapped onto a plant, e.g., around a stem or trunk, or otherwise applied to the surface of the plant to prevent death or damage after the plant has been girdled; i.e., the bark has been removed all the way around the stem or trunk.

A tree wrap has been available as a self-wound roll of tape with a sticky gum-based adhesive on one surface for bonding the wrap to the plant. While useful for preventing sun scald, there has been no suggestion that the wrap would benefit girdled trees, shrubs or other plants.

It is a general objective of the invention to furnish a protective wrap for plants which can be provided either as cut sheets or in the form of a roll and which will keep girdled trees from dying.

Another object is to provide a wrap for preventing damage to girdled trees with an optional biologically active protective agent that can, if desired, be molecularly dispersed within a flexible hydrophilic layer which is applied to a tape backing and is adapted to swell upon being exposed to atmospheric moisture for releasing the protective agency into the environment to thereby provide controlled release for the protective agency, either onto the surface of the plant or onto the outside surface of the tape.

U.S. Pat. No. 4,766,695 describes a tape for banding trees which comprises a film such as polyethylene coated with an elastomeric adhesive on one side. On the other side is a separate coating which is toxic to insects. One adjunct that can be used, if desired, with the present invention is a biologically active substance such as a pesticide. When one is used, it is an objective of the present invention to provide a protective wrap in sheet form or as a wound roll of tape wherein all active constituents are contained in a single pressure-sensitive, i.e., tacky, coating which bonds the wrap to the plant and contains the biologically active protective composition such a deer, rodent or insect repellant.

It has been proposed, for example in European patent application 0 367 140 A2, to disperse a repellant, e.g., a flea repellant, in a water insoluble copolymer such as ethylene/vinyl acetate copolymer for making a dog collar in which the copolymer serves both as a carrier for an insect repellant and a sheet of material which forms the collar. By contrast, it is an object of the present invention to employ a strong, flexible backing in sheet form to provide structural strength and to give the protective wrap its shape, allowing it to be supplied in a sheet or roll form together with a separate hydrophilic matrix that can, if desired, be used as a reservoir for the biologically active protective composition.

These and other more detailed and specific objects of the invention will be apparent in view of the following specification which illustrates by way of example but a few of the various forms of the present invention that will be apparent to those skilled in the art within the scope of the appended claims.

SUMMARY OF THE INVENTION

The invention provides a new method for using a wrap to protect girdled plants, e.g., trees and shrubs, to prevent them from dying. In accordance with the invention, a wrap is provided which includes a flexible tape backing composed of a water insoluble polymeric sheet suited for being wound into a roll or dispensed as cut sheets. To the backing is applied a homogeneous, hydrophilic, stable matrix. The matrix is hydratable by atmospheric moisture, has a bonding surface which is flexible and conforms to the contours of the plant, and is sufficiently tacky to hold the tape in place after being wrapped around the plant. The matrix includes a) a liquid phase comprising a polar, hydrophilic liquid for plasticizing the matrix, and b) a water soluble or water swellable hydrophilic film-forming polymer uniformly admixed with said liquid to form a flexible matrix. The wrap is applied to the plant in a particular way. It is applied in one or more winds or wraps with the hydrophilic surface against the girdled surface of the plant so as to cover the girdled area and preferably extends all the way around the trunk or stem. Most preferably, the wrap is applied so as to extend over and cover the edges of the bark both above and below the girdled area. When this method is followed the girdled plant will, surprisingly enough, very often continue to live. While the reason for the effectiveness of the invention is not known with certainty, it is theorized that the hydrophilic moisture-containing flexible matrix which remains bonded to the girdled surface assists in fluid transport through the sapwood and phloem and thus acts somewhat as a synthetic bark which enables the plant to live. The matrix serves as a reservoir which is easily hydrated and will swell in a humid environment to assist in carrying plant fluids through the girdled area to thereby preserve the life of the plant. Effectiveness, of course, depends upon prompt application to the girdled area.

A preferred liquid plasticizer is a monohydric or polyhydric alcohol. The film-former can comprise a natural or synthetic gum or other water soluble or swellable polymer. The matrix is preferably applied to the inside surface of the tape.

The tape can, if desired, have a reflective outer surface, e.g. by being metallized, or can be provided with a whitener such as $TiO_2$ or ZnO to reflect light for preventing sun scald. Preferably, a release coating is applied to the outer surface of the tape to enable the tape to be reliably unwound.

THE FIGURES

FIG. 1 is a perspective view of one form of protective wrap in accordance with the invention, namely, a strip of tape wound into a roll with the cut end of the tape greatly magnified;

FIG. 2 is a side view of a sapling wrapped with two pieces of protective tape in accordance with the invention; and FIG. 3 is a side elevational view partly in section of a girdled tree protected with a wrap in accordance with with the invention.

DESCRIPTION OF THE PREFERRED EMBODIMENTS

In FIG. 1 is shown a strip of tape 8 wound into a roll 10 on a core 12. The tape 8 includes a backing 14 formed from a porous, polymeric, water-insoluble material, e.g., a strip of nonwoven fabric composed of cellulose or polyester fibers or both. Applied to this backing 14 is a hydrophilic matrix 16 in the form of a gel coating that is hydratable by atmospheric moisture and is sufficiently sticky to bond the tape to a plant such as a sapling 18 (FIG. 2) when the tape strip 8 is applied to the plant 18. The tape can also include a release coating 20 on its outer surface to aid in unwinding the tape from the roll 10. The tape, instead of being provided in the form of a strip 8, can also be provided as a cut sheet 22 (FIG. 2), usually of rectangular form which can be applied to any part of a plant as required to cover the girdled area. It will be seen that the hydrated matrix 16 covers the entire inside surface of the tape backing 14. The release coating 20 can be any suitable known release coating, such as a silicone coating as described for example in U.S. Pat. No. 4,696,854, for preventing the blocking of tape when wound into rolls.

The backing 14 can comprise any of a variety of stable, water insoluble sheet materials such as nonwoven fabric, paper, porous plastic film, or the like. One preferred backing comprises a 10 mil. strip of nonwoven fabric comprising a mixture of cellulose fibers derived from wood pulp and polyester fibers. The fibers are assembled loosely into the backing to maintain porosity. If desired, a unifying or sizing resin can be applied to hold the fibers together. More specifically, in one preferred backing, a nonwoven fabric is used, such as a wetlay cellulosic, polyester nonwoven fabric.

In another embodiment of the invention, the backing 14 comprises a 10 mil. porous kraft paper composed of cellulosic fibers saturated with a wet strength resin such as an acrylic binder. In another form of the invention, the backing 14 comprises an open-celled foam plastic strip composed a foam open-cell polyvinyl acetate resin. The backing 14 can also comprise cotton fabric or a synthetic fabric. Suitable synthetic fabrics include nylon or polyester. In any event, the backing 14 is preferably pervious to air to permit at least partial penetration of the matrix 16 into the surface thereof. From this it can be seen that the backing 14 comprises a flexible tape composed of a water insoluble polymeric sheet that can be wound into a roll 10 as in FIG. 1 or dispensed as a cut sheet 22. The tape backing 14 is preferably composed of either a porous, fibrous composition or a porous, flexible plastic resinous sheet.

The composition of the hydrophilic matrix 16 will now be described. It is flexible but stable before use in the sense that it does not flow while on a roll. One important feature of the matrix 16 is that, when applied, it conforms to the contours of the surface of the plant 18 and also provides hydrophilic adhesive properties which enhance adhesion to the surface of the plant 18. The matrix 16 will also absorb moisture from the atmosphere which makes it become tackier as it weathers. If desired, it can serve as a reservoir for the controlled release of a protective composition.

The matrix 16 is formed from a solid film-forming phase comprising any naturally occurring or synthetic hydrophilic water dispersible, swellable or soluble polymer such as gum karaya, guar gum, gum acacia, pregelatinized starch, carboxypropylcellulose, carboxymethylcellulose, hydroxypropylcellulose, locust bean gum, carrageenan, gum tragacanth or other polysaccharide gums. The film-forming part of the matrix can also be formed from hydrophilic synthetic polymers such as polyacrylamide, polymethacrylamide, polmethacrylic acid, polyacrylic acid and their cogeners, polyvinylalcohol or polyoxyethylene.

The matrix 16 also includes a liquid phase. The liquid phase comprises any suitable hydrophilic polar and water-miscible, usually non-aqueous, liquid for plasticizing the film-former of the matrix. Examples of suitable liquids include polyhydric alcohols; i.e., alcohols containing two or more hydroxyl groups such as glycerol, polypropyleneglycol, polyethyleneglycol, propyleneglycol, ethyleneglycol, a solution of 70% sorbitol and 30% water, ethyleneglycol monoethylether, triethyleneglycol and 1,3 propane diol. When polyhydric alcohol is used, it is preferably used in an amount between about 10 percent and 65 percent by weight of the matrix. All quantities herein are expressed by weight.

The finished matrix 16 is somewhat elastic, flexible and hydrophilic. The surface is slightly tacky to the touch and typically has a thickness of about 0.008 inch. In one product, the matrix 16 was applied at a basis weight of 130 pounds per ream (3,000 square feet). The matrix 16 can be applied with a knife coater or by reverse roll coating. The finished wrap is stored as cut sheets or in rolls.

Refer now to FIG. 3. To use the wrap as shown at 26, it is unrolled and the hydrophilic matrix 28 is applied face down to cover the girdled area 24, preferably with the edges of the wrap 26 overlapping the back 30 above 32 and below 34 the girdled area 24. Care should be taken to press the tape firmly against the exposed area to form a good bond. The wrap should be applied promptly after the plant is girdled.

If desired, a biologically active composition can be dispersed in the matrix which will then serve as a reservoir that is easily hydrated and will swell in a humid environment for carrying the biologically active protective composition from the reservoir toward the surface of the wrap where it can be released to the environment so as to provide controlled release of the protective agency for guarding the plant. The protective composition is molecularly dispersed in the matrix 16. If used, the protective composition can include any rodent repellant or rodenticide, insecticide or insect repellant, fungicide, deer or herbivore repellant, or invertebrate repellant or toxic agent. It can also include substances in the nature of a hormonal agency such as a pheromone for attracting or repelling animal life. If an insect is beneficial to the plant 18, a pheromone can be used for attracting a particular species which is a predator to another that causes damage to the plant 18. Because the matrix 16 is hydratable, the protective agency is more readily available and thus is more biologically active than when contained in a hydrophobic coating, e.g., rubber-based adhesive.

Among suitable biologically active repellants are hot pepper extract; capsiacin; thiram (tetramethyl thiram disulfide) which is especially useful for deer, rabbits, squirrels and mice; benzyldiethyl [(2,6,xylyl carbonyl) methyl] ammonium saccharide which is particularly useful for dogs, cats, raccoons, rabbits, mice and deer; thymol; denatonium saccharide which is very bitter; pyrethrosin; pyrethrins from chrysanthemum flowers as an insecticide; pyrethrolone; chrysanthemic acid and other insecticides; and a fungicide such as a 2-(4-thiazolyl) benzimidazole hypophosphite type fungicide available from Merck and Company of Rahway, N.J. To reduce gypsy moth infection, Bacillus thuringiensis can be employed.

Among the biologically active attractants that can be used are pheromones, i.e., chemical hormone-like substances which allow animal life to communicate at a distance. Some act as alarm markers. Others act as territory markers or sex attractants. Among these are allomones and kairomones which serve as interspecific chemical messengers. These substances can cause a powerful reaction in the organism secreting them or receiving them, and can be nonadaptive or detrimental to organisms producing them.

To prevent the penetration of light, reflective materials or whiteners such as ZnO or $TiO_2$ in an amount that is biologically effective for protecting the plant from sun scald can be incorporated into the matrix 16 or, if desired, in the alternative applied to the back of the tape. If desired, a metallized plastic strip can also be incorporated into the back of the tape 8 at 20 to reflect sunlight for the prevention of sun scald.

The polar liquid phase of the matrix 16 causes the matrix to be hydratable by atmospheric moisture and also gives the matrix 16 a bonding surface which is flexible, will conform to the contours of the plant and makes the tape 8 sufficiently tacky, i.e., pressure-sensitive, to hold the tape 8 in place after being wrapped around the plant 18. In addition, since the matrix 16 is a hydrophilic gel, it will swell in the humid environment where plant juices are present in the girdled area of the plant, thus assisting in the transport of sap through the girdled section of the trunk or stem. If a biologically active material is present, the hydrophilic matrix will also help carry the biologically active protective composition from the matrix 16 which acts as a reservoir toward the surface of the wrap where it can be more readily released to the environment, thereby providing controlled release of the protective composition to guard the plant 18 from pests. The matrix 16 is only on the inside of the tape 8, but it can migrate through the backing 14 during moist weather to the outside of the tape 8 when it becomes hydrated, carrying the biologically active protective composition with it. Moreover, moisture from the plant or in the atmosphere also enhances the adhesive bond between the wrap and the plant 18.

The effect of varying constituents in the matrix 16 will now be described. The monohydric or polyhydric alcohol or other liquid should be present in an amount between 25 percent to 65 percent. Its effect is to swell the hydrophilic polymer and help to dissolve the biologically active material when the latter is present. It is also involved in hydrogen bonding and cross linking. Too much tends to make the product mushy, runny, soft or greasy feeling, and too little causes the product to be hard, dry and usually less tacky. The liquid phase also acts as a humectant. Propylene glycol is a less effective hydrating substance than glycerin.

The hydrophilic polymer builds viscosity by hydrogen bonding, eventually becoming semi-solid. The amount of hydrophilic polymer used can be varied from about 12 percent to 30 percent by weight. Excessive amounts cause the formula to become too thick and viscous to be coated evenly, and the product tends to be lumpy. However, if too little is used, the product may be soft, mushy or runny.

A water-dispersible tackifier or adhesive film agent can also be used. When present, it is preferably used in an amount from about 5 percent to 29 percent of the composition to add strength and/or tackiness. One example is anionic polyacrylamide, a copolymer of acrylamide and acrylic acid. This material is sold as Reten 521PX by Hercules Chemical Company of Wilmington, Del. If used in excess, the viscosity of the formula becomes excessive, unworkable and lumpy. If too little is used, the matrix may be soft or runny.

Another suitable water-dispersible tackifier is a copolymer of di-octylmaleate and vinyl acetate as an emulsion containing about 50 percent water. This product is sold under the name Flexbond 150 by the Air Products Company of Allentown, Pa. A similar emulsion copolymer adhesive is available from the H. B. Fuller Company of St. Paul, Minn., under the name PN 3120Z. These tackifying polymers, if present in excess, reduce pot life prior to application onto the backing and cause the material to become too tacky. However, if too little is used, tack may be insufficient and the product may not adhere well to the backing.

Another suitable tackifying agent comprises an emulsion compound which is a polymer of acrylic esters having an approximate molecular weight of about 500,000 and is water dispersible. This can be obtained, for example, under the trade name Hycar 261761 from the B. F. Goodrich Company of Cleveland, Ohio, for imparting tackiness to the matrix when used in an amount of about 5 percent to 25 percent of the matrix.

Polyacrylic acid having a molecular weight of about 50,000 is available from Poly Sciences, Inc., Warrington, Pa. When present, it assists in building viscosity by hydrogen bonding. Its low pH can be increased by adding caustic which will enhance its thickening properties. It can be used in an amount of about 1 percent to 21 percent as a film former. It also helps in stabilizing the formulation. If too much is used, the matrix can become too viscous and unworkable or lumpy.

The entire strip of tape 8 is biodegradable. That is to say, both the adhesive matrix 16 and the tape backing 14 are biodegradable. In addition, the matrix 16 serves both as an adhesive as well as a hydrophilic reservoir for assisting in fluid transport through the plant and as a reservoir for the biologically active ingredient. Since the backing 14 is porous, moisture will cause the matrix 16 and biologically active ingredient to migrate through the backing 14 to the outer surface of the tape 8 where it can be more effective. The whitener or metallized film makes the protective wrap more reflective and therefore provides better protection against sun scald. While a metallized film backing is not biodegradable, it provides excellent protection against solar heating in winter. The invention also provides a self-wound roll of tape which affords controlled release of the biologically active protective agent.

The invention will be better understood by reference to the following examples.

The matrices described below are applied by reverse roll coating to any of the following backings: 60 pound/ream wet-strength kraft paper, 23 pound/ream wet-lay nonwoven fabric composed of cullulose and polyester fibers sold under the trademark N-7601 by the Dexter Paper Company of Windsor Locks, Conn., cotton fabric, polyester fabric, polypore foamed plastic sheet which is an open-cell foamed polyvinylchloride film, and 10 ml. non-porous polyethylene film. When the backing is porous, a release agent such as silicone is applied to the outside surface of the backing, for example as described in U.S. Pat. No. 4,696,854 which is incorporated herein by reference.

Examples Without Pesticides or Other Biologically Active Agents

| | Ex. 1 | Ex. 2 | Ex. 3 | Ex. 4 |
|---|---|---|---|---|
| Glycerin | 53% | 58% | 60% | 59% |
| Karaya | 21% | 12% | 19% | 21% |
| TiO2 | 5% | 5% | 0% | 0% |
| PN3120Z tackifier | 21% | 25% | 21% | 20% |

| | Ex. 5 | Ex. 6 | Ex. 7 |
|---|---|---|---|
| Glycerin | 65% | 57% | 49% |
| Karaya | 24% | 21% | 23% |
| TiO2 | 0% | 4% | 0% |
| ZnO | 6% | 0% | 9% |
| PN3120Z tackifier | 5% | 18% | 19% |

| | Ex. 8 | Ex. 9 | Ex. 10 | Ex. 11 |
|---|---|---|---|---|
| Solution of 70% sorbitol and 30% water | 54% | 58% | 59% | 59% |
| Guar gum | 20% | 19% | 20% | 21% |
| TiO2 | 5% | 2% | 0% | 0% |
| Flexbond 150 tackifier | 21% | 21% | 21% | 20% |

| | Ex. 12 | Ex. 13 | Ex. 14 |
|---|---|---|---|
| Solution of 70% sorbitol and 30% water | 49% | 36% | 28% |
| Polyethylene glycol | 23% | 23% | 20% |
| Locust bean gum | 19% | 18% | 24% |
| TiO2 | 0% | 5% | 0% |
| ZnO | 0% | 0% | 9% |
| Hycar 26171 tackifier | 9% | 18% | 19% |

| | Ex. 15 | Ex. 16 | Ex. 17 | Ex. 18 |
|---|---|---|---|---|
| Glycerin | 34% | 47% | 43% | 45% |
| Triethylene glycol | 20% | 20% | 17% | 17% |
| Polyacrylamide | 20% | 19% | 19% | 18% |
| TiO2 | 5% | 2% | 0% | 0% |
| PN3120Z tackifier | 21% | 12% | 21% | 20% |

| | Ex. 19 | Ex. 20 | Ex. 21 |
|---|---|---|---|
| Solution of 70% sorbitol and 30% water | 35% | 49% | 33% |
| 1,3 propane diol | 15% | 11% | 15% |
| Carboxymethylcellulose | 19% | 18% | 24% |
| TiO2 | 2% | 4% | 0% |
| ZnO | 0% | 0% | 9% |
| Flexbond 150 tackifier | 29% | 18% | 19% |

| | Ex. 22 | Ex. 23 | Ex. 24 |
|---|---|---|---|
| Solution of 70% sorbitol and 30% water | 42% | 39% | 28% |
| Polypropylene glycol | 30% | 21% | 30% |
| Polyvinyl alcohol | 19% | 18% | 24% |
| TiO2 | 0% | 4% | 0% |
| ZnO | 0% | 0% | 9% |
| Flexbond 150 tackifier | 9% | 18% | 19% |

| | Ex. 25 | Ex. 26 | Ex. 27 | Ex. 28 |
|---|---|---|---|---|
| Polyethylene glycol | 54% | 58% | 57% | 55% |
| Polyacrylic acid | 21% | 19% | 19% | 18% |
| TiO2 | 4% | 2% | 3% | 0% |
| PN3120Z tackifier | 21% | 21% | 21% | 20% |
| Karaya | 0% | 0% | 0% | 7% |

| | Ex. 29 | Ex. 30 | Ex. 31 |
|---|---|---|---|
| Polyethylene oxide | 59% | 57% | 42% |
| Polymethacrylic acid | 22% | 21% | 30% |
| TiO2 | 0% | 4% | 0% |
| ZnO | 0% | 0% | 9% |
| PN3120Z tackifier | 19% | 18% | 19% |

Examples Containing Pesticides or Other Biologically Active Agents

| | Ex. 1 | Ex. 2 | Ex. 3 | Ex. 4 |
|---|---|---|---|---|
| Glycerin | 52% | 56% | 57% | 55% |
| Karaya | 21% | 12% | 19% | 18% |
| TiO2 | 5% | 5% | 0% | 0% |
| PN3120Z tackifier | 21% | 25% | 21% | 20% |
| Thiram | 1% | 0% | 0% | 7% |
| Thymol | 0% | 2% | 3% | 0% |

| | Ex. 5 | Ex. 6 | Ex. 7 |
|---|---|---|---|
| Glycerin | 57% | 51% | 48% |
| Karaya | 19% | 18% | 23% |
| TiO2 | 0% | 4% | 0% |
| ZnO | 6% | 0% | 9% |
| PN3120Z tackifier | 5% | 18% | 19% |
| Thiram | 9% | 9% | 0% |
| Thymol | 4% | 0% | 1% |

| | Ex. 8 | Ex. 9 | Ex. 10 | Ex. 11 |
|---|---|---|---|---|
| Solution of 70% sorbitol and 30% water | 53% | 56% | 57% | 55% |
| Guar gum | 20% | 19% | 19% | 18% |
| TiO2 | 5% | 2% | 0% | 0% |
| Flexbond 150 tackifier | 21% | 21% | 21% | 20% |
| Thiram | 1% | 0% | 0% | 7% |
| Denatonium benzoate | 0% | 2% | 3% | 0% |

| | Ex. 12 | Ex. 13 | Ex. 14 |
|---|---|---|---|
| Solution of 70% sorbitol and 30% water | 40% | 30% | 27% |
| Polyethylene glycol | 20% | 20% | 20% |
| Locust bean gum | 19% | 18% | 24% |
| TiO2 | 0% | 5% | 0% |
| ZnO | 0% | 0% | 9% |
| Hycar 26171 tackifier | 9% | 18% | 19% |
| Hot pepper extract | 9% | 9% | 0% |
| Benzyl diethyl [(2,6 xylyl carbonyl) methyl] ammonium saccharide | 3% | 0% | 1% |

| | Ex. 15 | Ex. 16 | Ex. 17 | Ex. 18 |
|---|---|---|---|---|
| Glycerin | 33% | 45% | 40% | 40% |
| Triethylene glycol | 20% | 20% | 17% | 15% |
| Polyacrylamide | 20% | 19% | 19% | 18% |
| TiO2 | 5% | 2% | 0% | 0% |
| PN3120Z tackifier | 21% | 12% | 21% | 20% |
| Thiram | 1% | 0% | 0% | 7% |
| Thymol | 0% | 2% | 3% | 0% |

| | Ex. 19 | Ex. 20 | Ex. 21 |
|---|---|---|---|
| Solution of 70% sorbitol and 30% water | 28% | 40% | 33% |
| 1,3 propane diol | 13% | 10% | 15% |
| Carboxymethylcellulose | 19% | 18% | 24% |
| TiO2 | 2% | 4% | 0% |
| ZnO | 0% | 0% | 9% |
| Flexbond 150 tackifier | 29% | 18% | 19% |
| Thiram | 9% | 9% | 0% |
| Denatonium saccharide | 0% | 1% | 0% |

| | Ex. 22 | Ex. 23 | Ex. 24 |
|---|---|---|---|
| Solution of 70% sorbitol and 30% water | 33% | 30% | 18% |
| Polypropylene glycol | 20% | 20% | 20% |
| Polyvinyl alcohol | 19% | 18% | 24% |
| TiO2 | 0% | 4% | 0% |
| ZnO | 0% | 0% | 9% |
| Flexbond 150 tackifier | 9% | 18% | 19% |
| Arbitech-20 fungicide | 9% | 9% | 1% |
| pyrethrosin | 10% | 1% | 9% |

-continued

|  | Ex. 25 | Ex. 26 | Ex. 27 | Ex. 28 |
| --- | --- | --- | --- | --- |
| Polyethylene glycol | 53% | 56% | 57% | 55% |
| Polyacrylic acid | 21% | 19% | 19% | 18% |
| TiO2 | 4% | 2% | 3% | 0% |
| PN3120Z tackifier | 21% | 21% | 21% | 20% |
| Capsiacin | 1% | 2% | 0% | 7% |
| Gypsy moth pheromone* | 0.01% | 0.01% | 0.01% | 0.01% |

|  | Ex. 29 | Ex. 30 | Ex. 31 |
| --- | --- | --- | --- |
| Polyethylene oxide | 53% | 51% | 42% |
| Polymethacrylic acid | 19% | 18% | 30% |
| TiO2 | 0% | 4% | 0% |
| ZnO | 0% | 0% | 9% |
| PN3120Z tackifier | 19% | 18% | 19% |
| Capsicum | 9% | 9% | 0% |
| Gypsy moth pheromone* | 0.01% | 0.01% | 0.01% |

*In other samples, commercially available allomones and kairomones are used in place of the pheromones.

Many variations of the present invention within the scope of the appended claims will be apparent to those skilled in the art once the principles described above are understood.

What is claimed is:

1. A method of protecting girdled plants, comprising:
   providing a protective wrap for plants having a flexible sheet backing including,
   a flexible water insoluble polymeric sheet suited for being wound into rolls or dispensed as cut sheets,
   a homogeneous hydrophilic stable matrix applied to the backing, said matrix being hydratable by atmospheric moisture and having a bonding surface adapted to conform to the contours of the plant and said bonding surface being sufficiently tacky to hold the tape in place after being wrapped around the plant, said matrix including
   (a) a liquid phase comprising a polar, hydrophilic, water-miscible liquid for plasticizing the matrix, and
   (b) a water-soluble or water-swellable natural or synthetic hydrophilic film-forming polymer uniformly admixed with said liquid to form a flexible matrix, and
   applying the wrap with the matrix portion bonded to a bark-free girdled surface of the plant to cover the girdled surface and thereby preserve the life of the plant.

2. The method of claim 1 wherein the wrap is a tape and the tape is wound around the plant over the girdled area.

3. The method of claim 1 wherein the wrap is applied to overlap the bark above and below the girdled area.

4. The method of claim 1 wherein the matrix contains a biologically active composition dispersed in the matrix, said matrix serving as a hydrophillic reservoir and said reservoir containing the biologically active composition, said reservoir being adapted to swell in a humid environment for carrying the biologically active composition from the reservoir toward a surface of the wrap where it can be released to the plant and to the environment so as to provide controlled release of the protective composition for guarding the plant.

5. The method of claim 1 wherein the matrix is applied as a reservoir on an inside surface of said sheet backing so as to contact the girdled surface of said plant and said backing is porous so as to expose said matrix to atmospheric moisture.

6. The method of protecting plants of claim 1 wherein the liquid phase comprises a polyhydric alcohol containing two or more hydroxyl groups and the filmforming natural or synthetic polymer comprises a member selected from the group consisting of karaya gum, guar gum, locust bean gum, carboxymethylcellulose, polyacrylamide, polymethacrylamide and its cogeners, polyacrylic acid, polymethacrylic acid, polyoxyethylene and polyvinyl alcohol.

7. The method of protecting plants of claim 4 wherein the biologically active composition comprises at least one member selected from the group consisting of hot pepper extract, capsiacin, thiram, benzyl diethyl [(2,6 xylyl carbonyl) methyl] ammonium saccharide, thymol, denatonium saccharide, pyrethrosin, pyrethrins, pyrethrolone, crysanthemic acid, Bacillus thuringiniesis, pheromones, allomones and kairomones.

8. The method of protecting plants of claim 1 wherein a whitener is incorporated into the wrap for reflecting light to reduce sun scald.

9. The method of protecting plants of claim 8 wherein the whitener comprises ZnO or TiO2 or is metallized to reflect sunlight from said backing.

10. The method of protecting plants of claim 4 wherein the protective composition comprises a member selected from the group consisting of a pesticide, fungicide, animal or insect attractant, animal or insect repellant and a pheromone.

11. A method of protecting girdled plants, comprising:
    providing a flexible, water absorbent protective wrap to be applied to the girdled surface of a plant comprising,
    a flexible porous backing element selected from the group consisting of cotton fabric, paper, synthetic fabric, plastic and nonwoven fabric;
    a tacky hydrophilic matrix attached to the backing comprising a homogeneous hydrophilic stable film having adhesive properties for adhesion to the surface of the plant and being sufficiently pliant to conform to the contours of the plant;
    said matrix including a solid phase comprising about 12 percent to 30 percent of the total weight of the matrix and including a natural or synthetic hydratable polymeric resin selected from the group consisting of polyacrylic acid, polymethacrylic acid, polymethacrylamide, polyoxyethylene, polyvinyl alcohol, polyacrylamide and their cogeners, and a natural or synthetic carbohydrate polymer;
    said matrix including a liquid phase comprising a polyhydric alcohol of from about 25 percent to 65 percent by weight of the matrix; and
    applying said wrap to the girdled area of said plant with said hydrophilic matrix bonded to said area for assisting in preserving the life of said girdled plant.

12. The method of claim 11 wherein said wrap includes a whitener is incorporated into the tape for increasing light reflection to enhance protection of the girdled area of the plant from sun scald.

13. The method of claim 11 wherein the protective wrap has a metallized reflective means for reflecting sunlight to protect the plant.

14. The method of claim 11 wherein a fungicide is dispersed in the stable hydrophilic matrix.

* * * * *